United States Patent [19]

Stewart

[11] 4,294,030
[45] Oct. 13, 1981

[54] ICE HOLE HEATER

[76] Inventor: James W. Stewart, 1104 Norton, St. Paul, Minn. 55117

[21] Appl. No.: 145,427

[22] Filed: May 1, 1980

[51] Int. Cl.³ .............................................. F23B 3/00
[52] U.S. Cl. ...................................... 43/4; 126/271.3
[58] Field of Search ............. 43/4; 126/271.3, 360 R, 126/360 A

[56] References Cited

U.S. PATENT DOCUMENTS

| 2,747,569 | 5/1956 | Holm et al. | 43/4 |
| 2,799,146 | 7/1957 | Meagher | 43/4 |
| 2,914,926 | 12/1959 | Meagher | 43/4 |
| 3,105,487 | 10/1963 | Anderson | 43/4 |
| 3,387,401 | 6/1968 | Stelmach | 43/4 |
| 3,464,137 | 9/1969 | England | 43/4 |
| 4,218,840 | 8/1980 | Cohee | 43/4 |

FOREIGN PATENT DOCUMENTS 457451 2/1975 U.S.S.R. .................................... 43/4

Primary Examiner—Stephen G. Kunin
Assistant Examiner—J. T. Zatarga
Attorney, Agent, or Firm—Jacobson and Johnson

[57] ABSTRACT

An ice fishing device having a cylindrical sleeve that is resilient and radially compressible to enable the ice fishing device to adapt to a variety of different size holes in the ice and members on the cylindrical sleeve to vertically and securely support the ice fishing device within the confines of a hole in the ice. A small charcoal chamber attaches to the side of the ice fishing device and holds sufficient charcoal to produce sufficient heat to keep the water in the hole from freezing yet keep the ice fishing device sufficiently cool so as not to burn a fishing line located therein.

1 Claim, 2 Drawing Figures

ICE HOLE HEATER

BACKGROUND OF THE INVENTION

1. Field of the Invention

This invention relates generally to ice fishing devices and, more specifically, to ice fishing devices for preventing a hole in the ice from freezing during winter fishing.

2. Description of the Prior Art

The concept of devices for maintaining an ice-free hole for ice fishing has been the object of many inventions. The basic problem is that winter fishing outdoors through a hole in the ice can be rather cold. However, more bothersome than being cold is the problem of the water freezing the line and bobber in the hole. Obviously, it is difficult to tell if the fish take the bait if the line and bobber are frozen in the ice. In order to maintain the hole free of ice there have been a number of different types of devices that have been used to heat the water or air around the hole. Still other prior art devices have been developed for the purpose of eliminating the need to redrill a hole between subsequent fishing outings. The present invention is directed toward the former type inventions and provides a solution to problems the prior art devices overlooked or did not attempt to solve.

The Anderson U.S. Pat. No. 3,105,487 shows a typical prior art device which comprises a hooded container that is placed over the hole. Located under the hooded container is a retaining ledge for holding charcoal or the like thereon. The Anderson device has the disadvantage of being partially over the hole and must be removed if a fish is caught. In addition, the Anderson device may freeze to the ice if water is splashed over the legs.

The Holm, et al U.S. Pat. No. 2,747,569 shows a circular container that fits into a hole in the ice. Located around the periphery of the container is a large chamber for holding the charcoal or the like. In one embodiment the side of the container is open. However, this device had the disadvantage that the charcoal container around the hole gets sufficiently hot to melt the fishing line besides only fitting loosely in the hole in the ice.

Still another prior art device is shown in the Obernolte U.S. Pat. No. 2,883,784. Obernolte shows a hooded dome with a candle or the like thereunder for generating heat inside the dome.

The other types of prior art devices are used to eliminate the problem of redrilling a hole from one day to the next. Such a device is shown in the Hedlund U.S. Pat. No. 4,114,304. Hedlund inserts a container with a combustible material located at the bottom of the container into a hole in the ice. The container displaces the water in the hole and then freezes to the ice. Igniting the material at the bottom of the container heats the container and permits the container to float free thus leaving an open hole.

Another prior art device is shown in the Meagher U.S. Pat. No. 2,799,146. Meagher has a conical tubular boot which is inserted in the opening in the ice with an ice plug that can be removed from the boot.

While not related to ice fishing devices, the Faye U.S. Pat. No. 341,327 shows the use of an adjustable expandable tube for use in well drilling.

The present invention comprises improvement to ice fishing devices by providing a simple structure which can be used in various size holes and when inserted and placed in the hole maintains the hole free of ice as well as prevents over heating of the metal to prevent damage to the fishing hole. In addition, the device is securely held in the ice so it will not interfere with fishing yet can be quickly and easily removed.

SUMMARY OF THE INVENTION

Briefly, the present invention comprises a radially adjustable resilient cylindrical sleeve which can be compressed and inserted into a hole in the ice. Members located on the cylindrical sleeve securely hold the sleeve in a vertical position in the ice. A small chamber attached to the side of the cylindrical sleeve holds charcoal to provide sufficient heat to maintain the hole free of ice yet prevent the sleeve from becoming sufficiently hot to damage the fishing line.

DESCRIPTION OF THE PREFERRED EMBODIMENT

Figure 1:
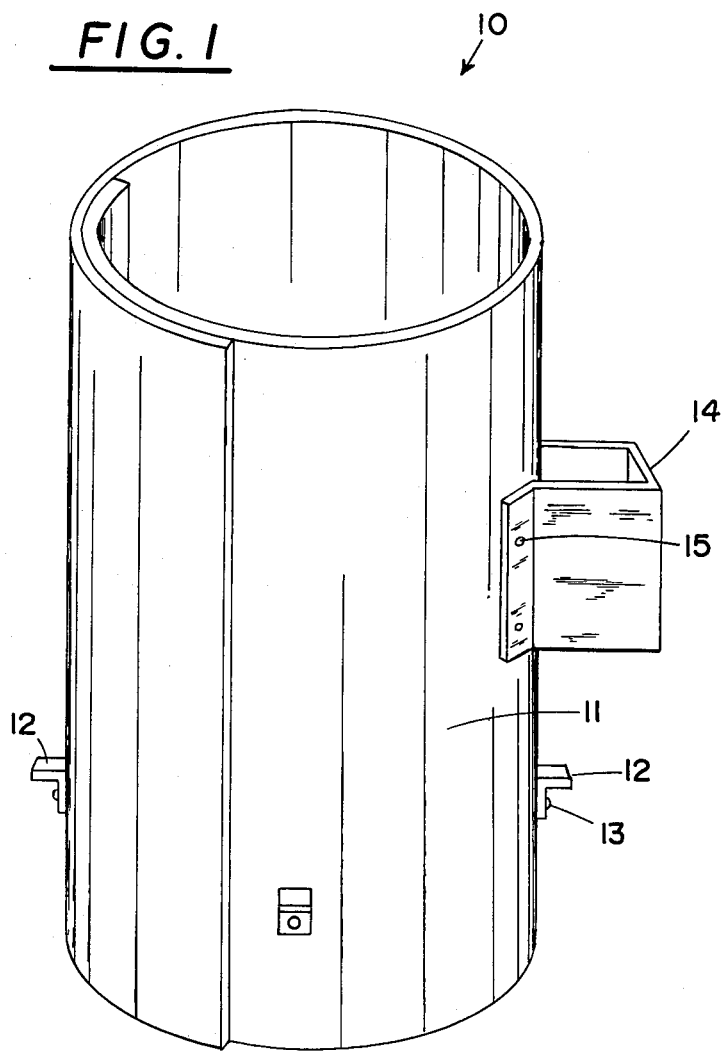
FIG. 1 is a perspective view of my invention.

Referring to FIG. 1, reference numeral 10 generally designates my invention which comprises a resilient cylindrical sleeve 11 which is slit longitudinally. The ends 17 and 18 of cylindrical sleeve 11 overlap to form the cylindrical shape. The cylindrical sleeve is made from a resilient metal which may be any of the various types of commercial steel or the like. The metal must have resiliency so that when it is compressed radially inward sleeve 10 has a natural tendency to expand radially outward to its original shape. Located on the sides of cylindrical sleeve 11 are a set of four ice gripping members 12 which are fastened thereto by a rivet 13. The ice gripping members permit cylindrical sleeve 10 to be securely positioned within the hole in the ice. Although four gripping members are shown, more or less could be used as well as a continuous member. The important feature is that there is something on the lower end of the cylindrical sleeve 10 to hold the cylindrical sleeve in a securely vertical position besides the smooth sides of the cylindrical sleeve.

Located on the side of sleeve 10 is a charcoal chamber 14 which is riveted thereto by rivets 15. Chamber 14 provides sufficient holding capacity for three or four conventional charcoal briquets.

Figure 2:
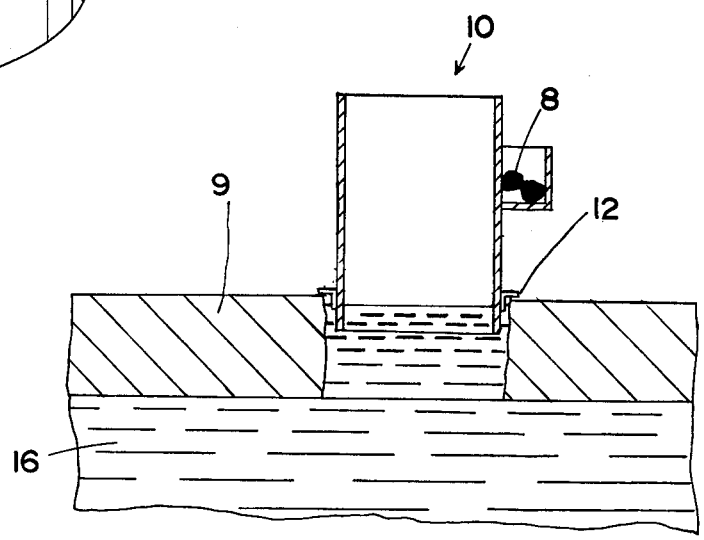
FIG. 2 is a sectional view of my invention located in a hole in the ice.

Referring to FIG. 2, my invention is shown located in ice 9 with water 16 extending into the hole in the ice and into the bottom of ice fishing device 10. Note, the resiliency of cylindrical sleeve 10 results in forcing sleeve 10 into the ice to securely hold my invention in a vertical position in the ice. Members 12 are located on top of ice 9 to prevent sleeve 10 from tipping or slipping into the hole in the ice. Burning charcoal 8 is located in chamber 14 and provides heat both for hand warming and for keeping the water from freezing in the ice.

In the preferred embodiment my cylindrical sleeve is provided with a sufficiently large diameter so that merely radially compressing the sleeve permits the use of my device with smaller size holes.

The success of my invention as for maintaining the hole free of ice without damaging the fishing line is believed partially due to the ability of my ice hole heater to be securely positioned directly in the ice and partially in the water. The water acts as heat sink to conduct heat away from the charcoal chamber so that it eliminates the danger of the sleeve becoming sufficiently hot to melt a fishing line located therein. The secure position capability of my ice fishing device also prevents my device from being knocked over as a fish is pulled therethrough.

My heat chamber 14, which is located on the top of cylindrical sleeve 10, is sufficiently high up so that when the cylindrical sleeve is inserted in the ice, heat chamber 14 does not contact the ice.

I claim:

1. An ice fishing device operable for fishing therethrough comprising:

a cylindrical sleeve having a top and a bottom, said cylindrical sleeve having a pair of ends that overlap each other to define a cylindrical shape having an interior surface and an exterior surface, said cylindrical sleeve made from a resilient material so that radial compression of said cylindrical sleeve produces a force to restore said cylindrical sleeve to its original shape, said cylindrical sleeve having an unobstructed passage therethrough to permit one to pull a fish therethrough without displacing said cylindrical sleeve;

ice gripping members located adjacent but spaced from the bottom of said cylindrical sleeve, said ice gripping members coacting with said cylindrical sleeve to permit a user to position the bottom of said ice fishing device in a hole in the ice; and a heat chamber attached to exterior surface of said cylindrical sleeve so that when said cylindrical device is positioned in the ice said heat chamber is remotely located from a fishing line to permit heat transfer from said heat chamber to said cylindrical sleeve to prevent freezing of water located in the hole in the ice, said heat chamber also acting as a source of heat for warming a user's hands, said heat chamber being disposed above the ice gripping members and intermediate the ends of the cylindrical sleeve.

* * * * *